United States Patent
Ballarin

(10) Patent No.: US 11,396,263 B2
(45) Date of Patent: Jul. 26, 2022

(54) MIRROR ASSEMBLY FOR A VEHICLE

(71) Applicant: Volvo Truck Corporation, Gothenburg (SE)

(72) Inventor: Paolo Ballarin, Saint Genis Laval (FR)

(73) Assignee: Volvo Truck Corporation, Gothenburg (SE)

( * ) Notice: Subject to any disclaimer, the term of this patent is extended or adjusted under 35 U.S.C. 154(b) by 207 days.

(21) Appl. No.: 16/759,967

(22) PCT Filed: Dec. 1, 2017

(86) PCT No.: PCT/IB2017/001681
§ 371 (c)(1),
(2) Date: Apr. 28, 2020

(87) PCT Pub. No.: WO2019/106401
PCT Pub. Date: Jun. 6, 2019

(65) Prior Publication Data
US 2020/0276935 A1  Sep. 3, 2020

(51) Int. Cl.
*B60R 1/06* (2006.01)
(52) U.S. Cl.
CPC ..................... *B60R 1/06* (2013.01)
(58) Field of Classification Search
CPC ............................... B60R 1/06; B60R 1/0605
USPC ........................................................ 359/872
See application file for complete search history.

(56) References Cited

U.S. PATENT DOCUMENTS

| 4,488,778 A | 12/1984 | Polzer et al. |
| 4,867,408 A * | 9/1989 | Ozaki ..................... B60R 1/072 248/483 |
| 4,981,279 A * | 1/1991 | Andreas .................. B60R 1/066 248/478 |

(Continued)

FOREIGN PATENT DOCUMENTS

| EP | 0276677 A1 | 8/1988 |
| EP | 0567245 A1 | 10/1993 |

(Continued)

OTHER PUBLICATIONS

International Search Report and Written Opinion for International Patent Application No. PCT/IB2017/001681, dated Mar. 6, 2018, 10 pages.

*Primary Examiner* — Ricky D Shafer
(74) *Attorney, Agent, or Firm* — Withrow & Terranova, PLLC

(57) ABSTRACT

A mirror assembly (1) for a vehicle, the assembly including a casing (3), a base plate (9) fixed in the casing (6) and a receiving plate (8) rotatably attached to the base plate (9); a mirror plate (2) having a mirror glass (3) secured on a mounting plate (9); the mirror assembly (1) further having attachment means interposed between said receiving plate (8) and said mirror plate (2), said attachment means having a first part provided in the mirror plate (2) and a second part provided in the receiving plate (8), said first part having at least one centering element and at least one releasable locking element, and said second part having at least one second complementary centering element configured to receive the said first centering element and at least one opening (14, 140) configured to receive the said at least one locking element (12, 120).

17 Claims, 5 Drawing Sheets

(56) References Cited

U.S. PATENT DOCUMENTS

| | | | | |
|---|---|---|---|---|
| 5,604,645 A * | 2/1997 | Weaver | ............... | B60R 1/072 248/27.3 |
| 5,615,054 A * | 3/1997 | Lang | ............... | B60R 1/0605 359/841 |
| 5,721,646 A * | 2/1998 | Catlin | ............... | B60R 1/0605 248/476 |
| 6,325,519 B1 * | 12/2001 | Lang | ............... | B60R 1/0605 248/477 |
| 6,347,872 B1 * | 2/2002 | Brechbill | ............... | B60R 1/06 359/838 |
| 7,033,033 B2 * | 4/2006 | Ishigami | ............... | B60R 1/06 248/476 |
| 7,357,522 B2 * | 4/2008 | Courbon | ............... | B60R 1/0605 248/476 |
| 7,883,223 B1 * | 2/2011 | Foote | ............... | B60R 1/072 359/841 |
| 8,579,444 B2 * | 11/2013 | Lettis | ............... | B60R 1/06 359/871 |
| 9,840,200 B2 * | 12/2017 | de Swardt | ............... | B60R 1/06 |
| 10,654,416 B2 * | 5/2020 | Cano | ............... | B60R 1/07 |

FOREIGN PATENT DOCUMENTS

| | | |
|---|---|---|
| EP | 1225092 A2 | 7/2002 |
| JP | H10181452 A | 7/1998 |

* cited by examiner

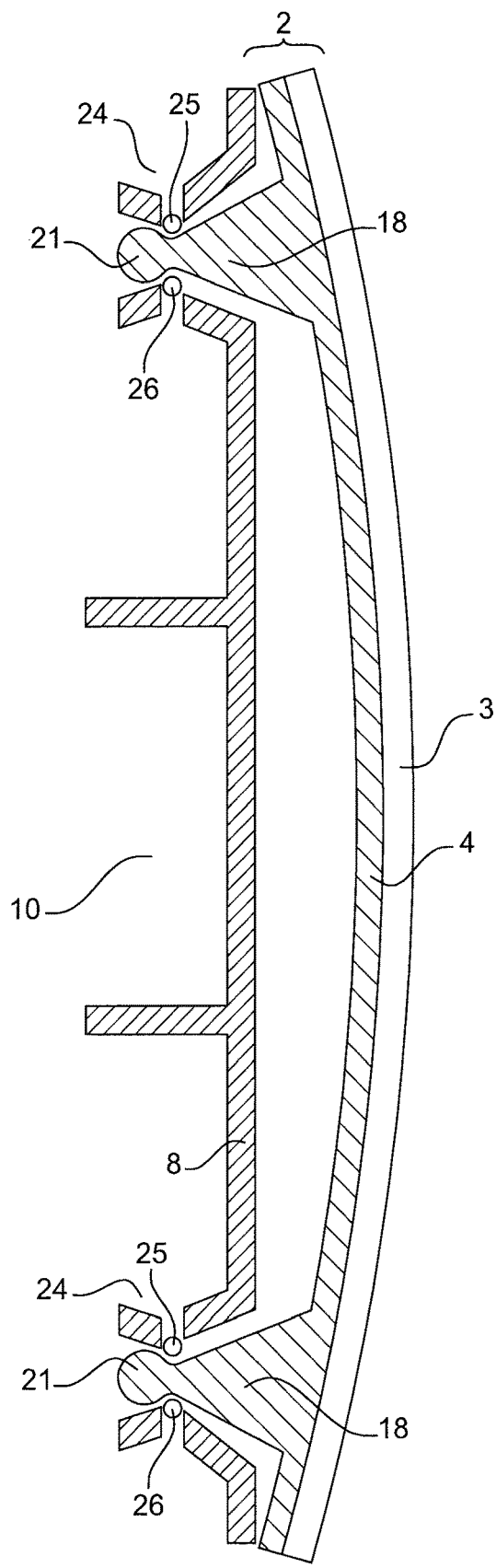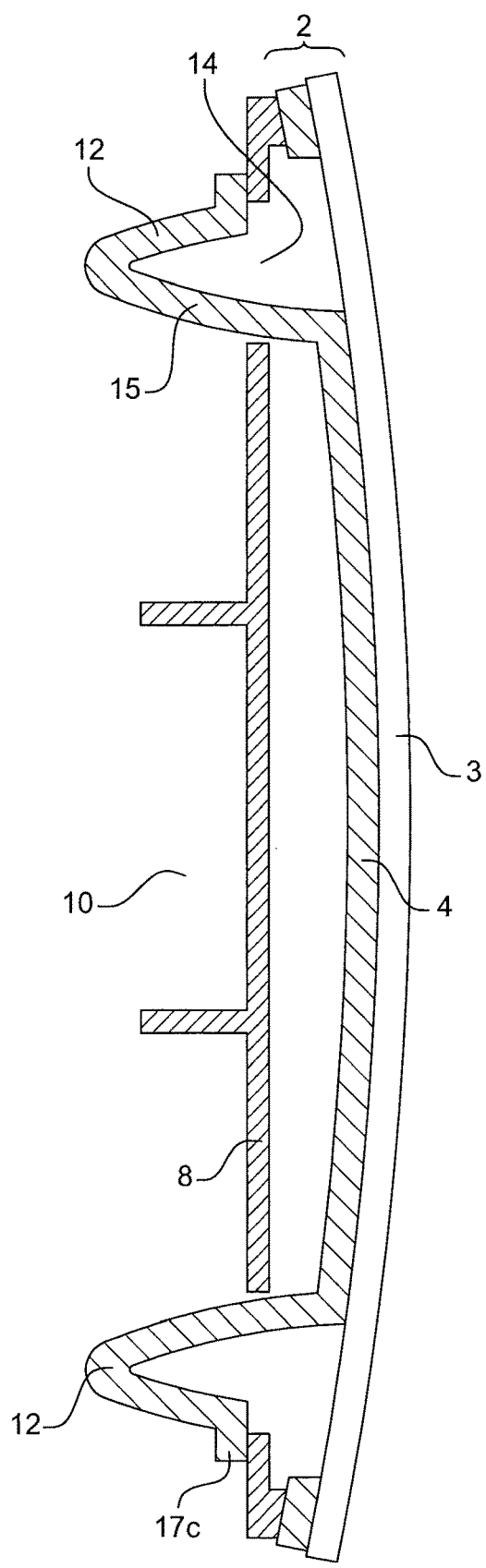
Fig. 5 Fig. 6

MIRROR ASSEMBLY FOR A VEHICLE

This application is a 35 USC 371 national phase filing of International Application No. PCT/IB2017/001681, filed Dec. 1, 2017, the disclosure of which is incorporated herein by reference in its entirety.

TECHNICAL FIELD

The invention relates to a mirror assembly for a vehicle and in particular to an external rear view mirror assembly for a vehicle such as a truck, bus or construction equipment.

BACKGROUND

External rear view mirrors for vehicles in general are well known and almost invariably comprise a forwardly directed external casing for the mirror which may be directly mounted to the vehicle or may be mounted to the vehicle by a support to enable the mirror to be spaced from the side of the vehicle for an improved rear view. The casing forms protection for the mirror and can be formed to match the vehicle's style and to reduce aerodynamic drag and often houses manual or electric mechanisms for rotating the mirror within the casing. The mirror itself is mounted at the rear of the casing in an aperture formed in the casing. The mirror is usually mounted on a base plate within the casing which may itself be rotatably mounted to the casing to allow the aforesaid rotation of the mirror.

When vehicle external rear view mirrors break, usually from an impact with another vehicle or a stationary object, removing and replacing the mirror itself, located within the casing, can be problematic.

Although, generally, such mirrors can be removed and replaced without the use of tools, the tasks of removal and re-installation are usually difficult and may lead to breakage of the mirror and thus risk injury to the operator.

Removal entails gaining access to the mirror itself. This is not easy as the mirror is usually completely surrounded by the casing with little or no access to the mirror edges. Usually, the mirror will be rotatably mounted within the casing and must be rotated to its maximum in one direction, normally upwardly, when access to the lower edge of the mirror can sometimes be obtained. In this case, the lower edge must then be wrenched outwards in order to dislodge the mirror from its rotatable receiving element. This is an uncertain task which often leads to either breakage of the mirror or straining of the retaining clips which retain the mirror to the receiving element. There is also risk to the operator of being cut by the broken mirror.

Re-installation of the mirror can also be difficult because the clips or clamps which hold the mirror in place on the receiving element become hidden from view as soon as the mirror is offered up to the casing. The gap between the mirror and casing, around the edge of the mirror, is kept narrow for aesthetic and aerodynamic reasons and to prevent ingress of dirt behind the mirror. Furthermore, the receiving element is itself movable within the casing, making the task of locating and applying sufficient pressure to the clamps on the receiving element much more difficult.

With one common arrangement, the rear-view mirror is provided on its back surface with engagement elements, such as protruding tabs or clips, which have a snap-fit engagement with corresponding elements on a support plate which is located in the housing recess of the mirror.

An alternative arrangement includes providing a steel wire as an engagement element on the back of the rear-view mirror, and the wire then snap-fits into fittings within the housing of the mirror.

With all of these arrangements, access to the interface between the rear-view mirror and housing is generally very restricted. The operator must tilt the rear-view mirror and then insert his fingers or a tool into the gap between the mirror plate and the housing. It will be appreciated that visibility is very restricted and the operator often must work blindly relying on touch and feel.

Importantly, the mirror plate should be held securely enough in the housing so that it does not fall out in use. This requires a tight fit for the attachment elements, which means that a significant force is generally required to pull the mirror plate away from the support element.

Another arrangement is providing sliding tracks on both the back of the rear-view mirror and on a carrier plate within the housing, which enable the rear-view mirror to be slid sideways to mount it in the housing. Again the engagement must be secure between the sliding tracks and so a significant effort from the operator is required to mount and remove the rear-view mirror. Visibility of the mechanism is also restricted, so in order to remove the rear-view mirror the operator must reach into the housing and feel for the components.

Generally, with all of the known arrangements, it is difficult to align the engagement mechanisms and guide the rear-view mirror into place, the removal operation must be done blindly due to restricted visibility, and the operator must use both hands and a significant amount of force. Furthermore, the rear-view mirror is often mounted onto a support plate which is moveably mounted within the housing so that the orientation of the rear-view mirror can be adjusted to suit driver requirements. Simply aligning and mounting the rear-view mirror onto a moveable target presents difficulties to the operator.

A further difficulty with heavy-duty vehicles, such as trucks, is that exterior rear-view mirror assemblies are provided at elevated positions on the vehicle body. This means that maintenance work on the rear-view mirror assembly must be carried out at height which adds to the difficulty of the task and presents a potential risk for the operator.

Embodiments of the invention seek to provide rear-view mirror assemblies which overcome some or all of these problems.

SUMMARY

An object of the invention is to provide a mirror assembly which reduces or eliminates at least some of the above prior art disadvantages.

According to the invention there is provided a mirror assembly for a vehicle, the assembly including a casing, a base plate fixed in the casing and a receiving plate rotatably attached to the base plate; and a mirror plate having a mirror glass secured on a mounting plate. The mirror assembly further includes attachment means interposed between said receiving plate and said mirror plate, said attachment means having a first part provided in the receiving plate and a second part provided on the mirror plate; said first part has at least one centering element and at least one releasable locking element, and said second part has at least one second complementary centering element configured to receive the said first centering element and at least one opening configured to receive the said at least one locking element.

In an embodiment, the first centering element includes at least one centering pin attached to the mounting plate and the second centering element includes at least one funnel shaped centering surface formed in the receiving plate.

In an embodiment, the at least one centering pin includes a conical shape defining a first vertex angle and the at least one funnel defines a second vertex angle, the first vertex angle being smaller than the second vertex angle. The funnel or funnels may define a wide angle between the walls thereof which will allow easy initial engagement. In addition, a wide funnel angle will allow the mirror to be sufficiently pivoted, for easier withdrawal of the mirror plate from the mirror assembly.

In an embodiment, at least one releasable locking element includes a resilient clip engageable into the at least one opening.

In an embodiment, at least one releasable locking element includes a tapered resilient clip engageable into a locking opening in the receiving element of the mirror plate, the locking opening having chamfers.

In an embodiment, the at least one resilient clip is positioned on an edge of the receiving plate and the casing includes a flexible tap configured to bias the resilient clip into an unlocked position. This feature may have the dual advantage of reducing vibration of the mirror plate and of biasing the mirror to protrude from the casing upon release of a locking element to enable easy removal by an operator.

In an embodiment, the receiving plate includes at least one spring tab which exerts an elastic force onto the mounting plate.

In an embodiment, the centering pin includes at its distal end a ball and that the funnel comprises a ball-and-socket joint into which the ball comes into engagement. This arrangement enables the mirror plate to be pivoted to a position where an edge of the mirror plate may be reached by an operator to pull the mirror out of the ball-in-socket joints. Pivoting of the mirror in this way may be achieved by the operator pressing on the mirror on an opposite side of the pivot line from the resilient clip.

In an embodiment, when at least one resilient clip is released, the mirror plate is rotated about the socket joint such that at least a portion of the mirror extends outside the casing to allow an operator to grasp the mirror and disengage the ball-and socket joints.

In an embodiment, the ball-and-socket joints are positioned in the region of a periphery of the mirror plate to provide stable mounting of the mirror plate in the casing.

The invention further relates to a vehicle comprising a mirror assembly as defined hereinbefore.

Further advantages and advantageous features of the invention are disclosed in the following description.

BRIEF DESCRIPTION OF THE DRAWINGS

With reference to the appended drawings, below, there follows a more detailed description of embodiments of the invention, cited as examples.

In the drawings:

FIG. 5 is a sectional side view of a mirror plate and a receiving plate according to sectional plan AA' of FIG. 3

FIG. 6 is a sectional side view of a mirror plate and a receiving plate according to sectional plan BB' of FIG. 3;

DETAILED DESCRIPTION OF EXAMPLE EMBODIMENTS OF THE INVENTION

Figure 1:
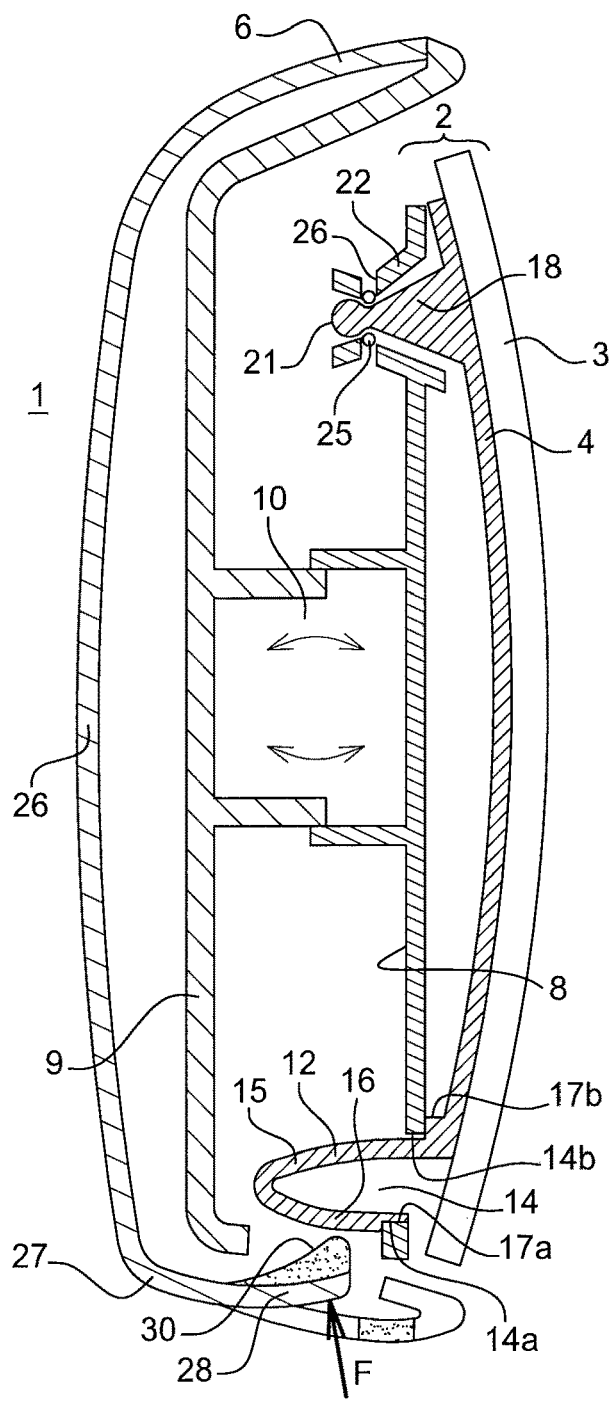
FIG. 1 is a side part sectional view of a mirror assembly according to the invention.
Figure 2:
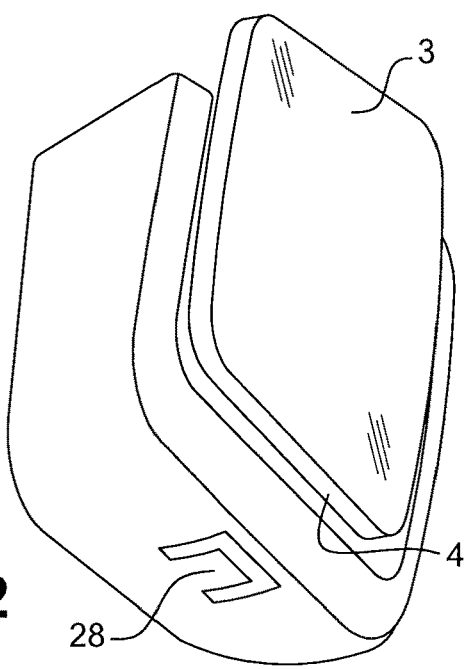
FIG. 2 is a schematic perspective view, from one side, of an assembly having a flexible tab formed in the casing, according to the invention.

Referring to the drawings, FIGS. 1 and 2 show a mirror assembly 1 according to the invention.

The assembly of FIG. 1 includes a mirror plate 2 comprised of a mirror glass 3 bonded on a mounting plate 4, supported within, and indirectly mounted on a casing 6. To this end, the mirror assembly 1 includes two elements: a receiving plate 8 and a base plate 9.

The base plate 9 is fixedly secured in the casing 6 by a suitable adhesive bonding, as shown, or alternatively by mechanical locking means. The receiving plate 8 is rotatably mounted on the base plate 9 via a suitable rotatable actuator 10.

The mirror plate 2 is mounted and is retained on the receiving plate 8 by mechanical locking means. To this end, the mirror plate 2 is equipped with a series of resilient clips 12. The resilient clips 12 are provided on the mounting plate 4 and engage into corresponding locking openings 14 formed in the receiving plate 8. The resilient clips 12 are preferably located proximate to the edge of the mounting plate 4 and similarly, the locking openings 14 are located proximate to the edge of receiving plate 8. Each resilient clip 12 can have a general V shape formed by a first leg 15 attached to the mounting plate and a second leg 16 resiliently linked to the first leg 15. As can be seen in FIG. 1, the second leg 16 can include a notch 17a at its free end. The leg 15 can include a shoulder 17b at its ends opposite its junction with leg 16 i.e. at its junction with the mounting plate 4. In the embodiment shown in FIG. 1 the mounting plate and both legs 15, 16 of the resilient clip 12 are integral. The locking opening 14 formed in the receiving plate 8 forms two edges 17b and 17a. When a resilient clip 12 is slide into the opening 14, shoulder 17b abuts against edge 14b so the sliding of the resilient clip 12 into the opening 14 is stopped and in that position notch 17a abuts against edge 14a so that resilient clip 12 is interlocked and maintained in place within opening 14.

Figure 3:
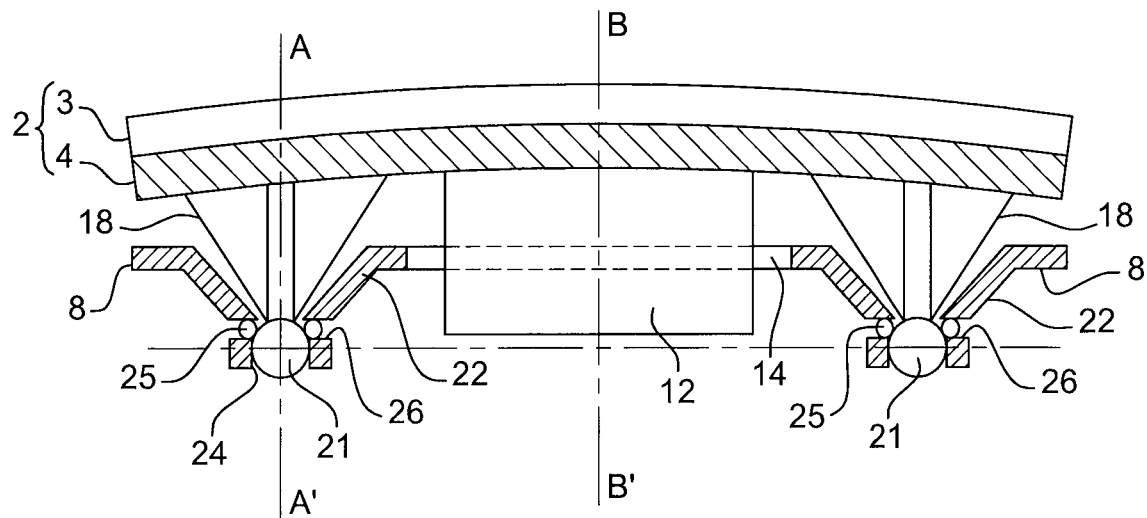
FIG. 3 is a sectional top view of a mirror assembly according to the invention.

As shown in FIG. 1 or in FIG. 3, the mounting plate 4 further includes a series of centering pins 18. The centering pins 18 can have an overall conical shape or frustoconical shape and can be formed by, for example, four triangular walls 20 which are perpendicularly linked. In the illustrated embodiment, the centering pins 18 can be each provided with a distal ball 21.

The receiving plate 8 includes guiding or centering elements in the form of a series of funnels 22 having a complementary shape to the centering pins 18; at their narrow end, each funnel 22 can include a ball-and-socket joint 24 having an expandable wire 25 clamped in slot 26 in order to be in contact with the ball 21 when the centering pin 18 is inserted completely into the funnel 22 so as to maintain the distal ball 21 in place and prevent the centering pin 18 to slide out of the funnel 22. This enables to create "tension" to avoid vibrations.

The vertex angle of the funnel 22 is greater than the vertex angle of the centering pin 18 thus allowing a certain freedom of movement of the mirror plate 2 with regards to the receiving plate when the locking element, in this embodiment, the resilient clip 12 is not engaged into or is disengaged from the receiving plate 8.

In an embodiment, the casing 6 can include a flexible tab 28 as clearly shown in FIG. 2. In the illustrated example of FIG. 1, the casing 6 has a substantially parallelepipedic shape formed by a back wall 26 and a side wall 27 wherein the flexible tab 28 is formed. The flexible tab 28 can be depressed in the direction of the arrow F (shown in FIG. 1) to push on the leg 16 of resilient clip 12 via a tab extension 30. This pushing action on the leg enables to free notch 17a from edge 14a of the receiving plate. As a result the resilient clip 12 can slide out the opening 14 of the receiving plate 8, the locking element is released.

In another embodiment, the flexible tab 28 is omitted and the casing 6 includes a continuous peripheral wall.

Preferably, the centering pins 18 and resilient clips 12 are laid on the surface of the mounting plate 4 and corresponding funnels 22 and locking openings 14 are laid on the surface of the receiving plate 8 symmetrically with regards to the longitudinal axis and the transversal axis of the mirror plate 2.

In operation, the mirror plate 2 is secured onto the receiving plate 8 via the resilient clips 12 which are locked into the openings 14 of the receiving plate 8. The ball 21 of each centering pin 18 engages the socket of the ball and socket joint 24 provided at the end of the funnel 22.

FIG. 3 is a sectional top view of a mirror assembly according to the invention. In this figure it is shown that there are two centering elements 22 provided in the receiving plate 8, each receiving a complementary centering element 18 and which are arranged symmetrically with regards to the longitudinal axis of the mirror plate 2. As mentioned above, the ball head or distal ball 21 is retained by the wire or wire clip 25, which is supported by the conical geometry of the centering pin 18. The slots 26 let the wire 25 be in contact with the ball head 21 locally. The centering pins 18 are guided by the funnels 22 to insert the mirrors in position, the operator pushes with enough force the mirror so that ball heads 21 snap through the wire clips 25. To release the mirror plate 2, the operator needs to pull strongly enough to force the ball heads 21 through the wire 25 so that the centering pins are unsnapped from the funnels 22.

Figure 4:
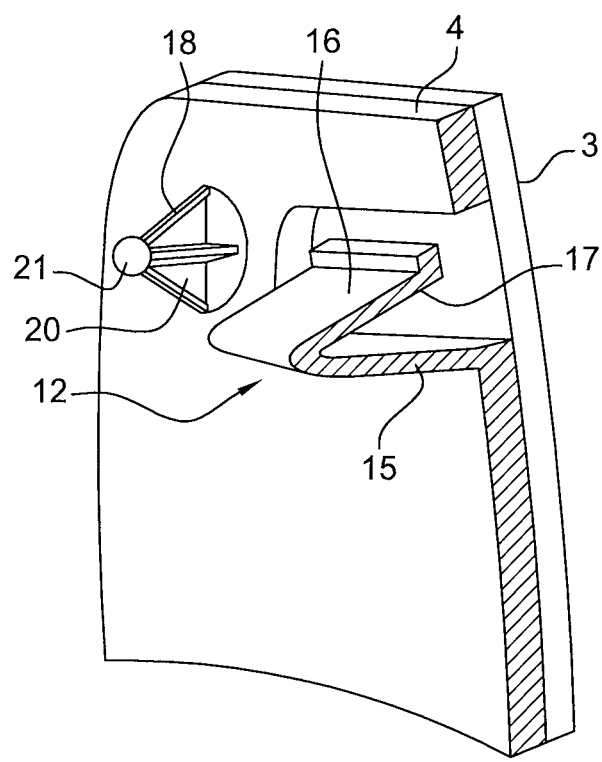
FIG. 4 is a rear perspective view of a part of a mirror plate according to the invention.

FIG. 4 is a rear perspective view of a part of a mirror plate only showing one centering element and one locking element of the mounting plate 4 of the mirror plate 2 when the mirror is not installed into the casing 6. In the embodiment shown in FIG. 4, the resilient clip is not provided with a shoulder 17b nor with a notch 17a. In this particular embodiment, the leg 16 of the resilient clip has its free end having a border or a wedge 17c that will rest on the edge of the opening 14 (on the side facing the base plate 9) once the clip 12 has slide far enough through the opening 14. Indeed once the border 17c has passed through the opening 14, the resilience of the clip 12 makes the legs 15 and 16 spread so that the border 17c rests on the receiving plate edge and so that the clip 12 cannot be further displaced through the opening 14. In this particular embodiment, by expanding with their wedge shape in the openings 14, resilient clips 12 create pressure on the rotating receiving plate 8 to have a good stable fit and so to avoid vibrations.

FIG. 5 is a sectional side view of a mirror plate and a receiving plate according to sectional plan AA' of FIG. 3 and FIG. 6 is a sectional side view of a mirror plate and a receiving plate according to sectional plan BB' of FIG. 3;

FIG. 5 clearly shows that in this embodiment the mounting plate 4 comprises along the axis AA' a top centering element and a bottom centering element as described earlier. Figure also shows that the receiving plate 8 comprises a top complementary centering element and a bottom complementary centering element as described earlier as well. FIG. 6 shows that in the embodiment of FIG. 5 and FIG. 3 the mounting plate 4, along a transversal axis of the mirror plate 2, is provided with a top resilient clip and a bottom resilient clip both having corresponding openings 14 within the receiving plate 8. It seems therefore that the mirror plate 2 of the embodiment shown in FIG. 3, FIG. 5 and FIG. 6 has at least four centering pins 18 in the region of a periphery of the mirror plate (near each edge of the mirror plate) and two locking elements 12 near the mirror plate borders on a longitudinal axis.

Figure 8:
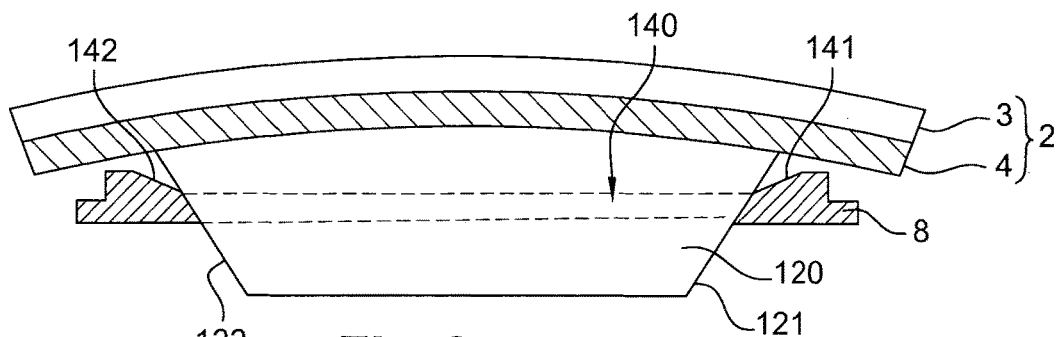
FIG. 8 is a top view of a resilient clip of the mirror plate located in an opening of the receiving plate according to a further embodiment of the invention.

FIG. 8 is a top view of a resilient clip of the mirror plate located in an opening of the receiving plate according to a further embodiment of the invention. FIG. 8 shows schematically an arrangement in which the mounting plate 4 has a tapered resilient clip 120 co-operable with a locking opening 140 of the receiving plate 8. The locking opening 140 has chamfers 141, 142 that co-operate with chamfers 121, 122 of the tapered resilient clip 120 to engage precisely the resilient clip 120 through opening 140 of the rotating receiving plate 8.

Figure 9:
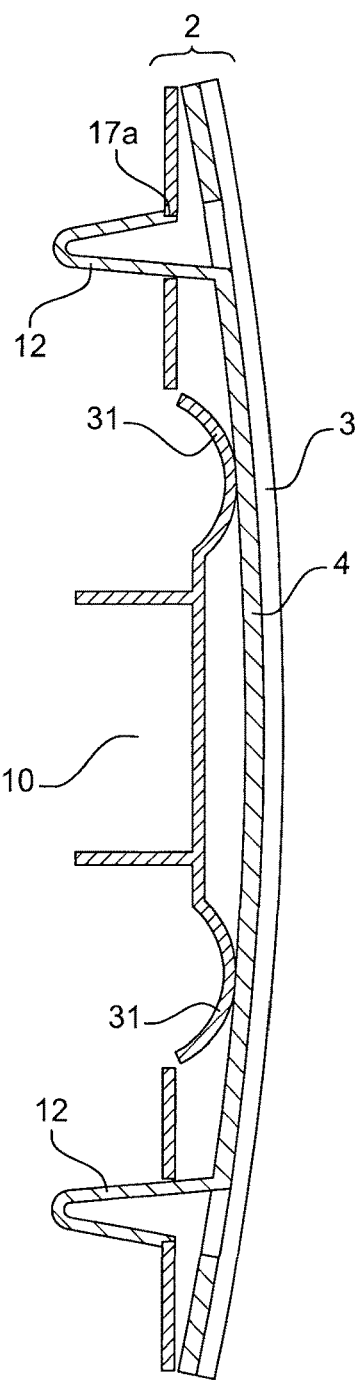
FIG. 9 is a schematic side sectional view of the mirror plate and sprung receiving plate according to another embodiment of the present invention.

FIG. 9 shows that the receiving plate 8 can include series of spring tabs 31. Spring tabs 31 in the receiving plate 8 bias the mirror plate 2 towards disengagement and encourage movement of the mirror plate 2 away from the casing 6 as soon as spring tabs 31 are released (by pushing on leg 16 of resilient clip 12 as described in FIG. 1 via a flexible tab or directly with a finger as it will described below). The spring tabs 31 also ensure the mirror plate 2 does not vibrate in operation.

In the embodiment shown in FIG. 9, the resilient clip 12 is not provided with a shoulder 17b but is provided with a notch 17a, same notch as the one described above.

The advantage the different fixation devices according to the different embodiments of the present invention is that instead of just pushing/pulling on the mirror plate 2 to install it or release it, it enables by only pushing in a precise area of the mirror plate 2 with ones fingers to get a better sense of quality and control of the engagement (better feed back) of the mirror in its location and facilitates the installation and release of the mirror plate 2 as the user can manage without the need to see what is behind the mirror plate 2.

Figure 7:
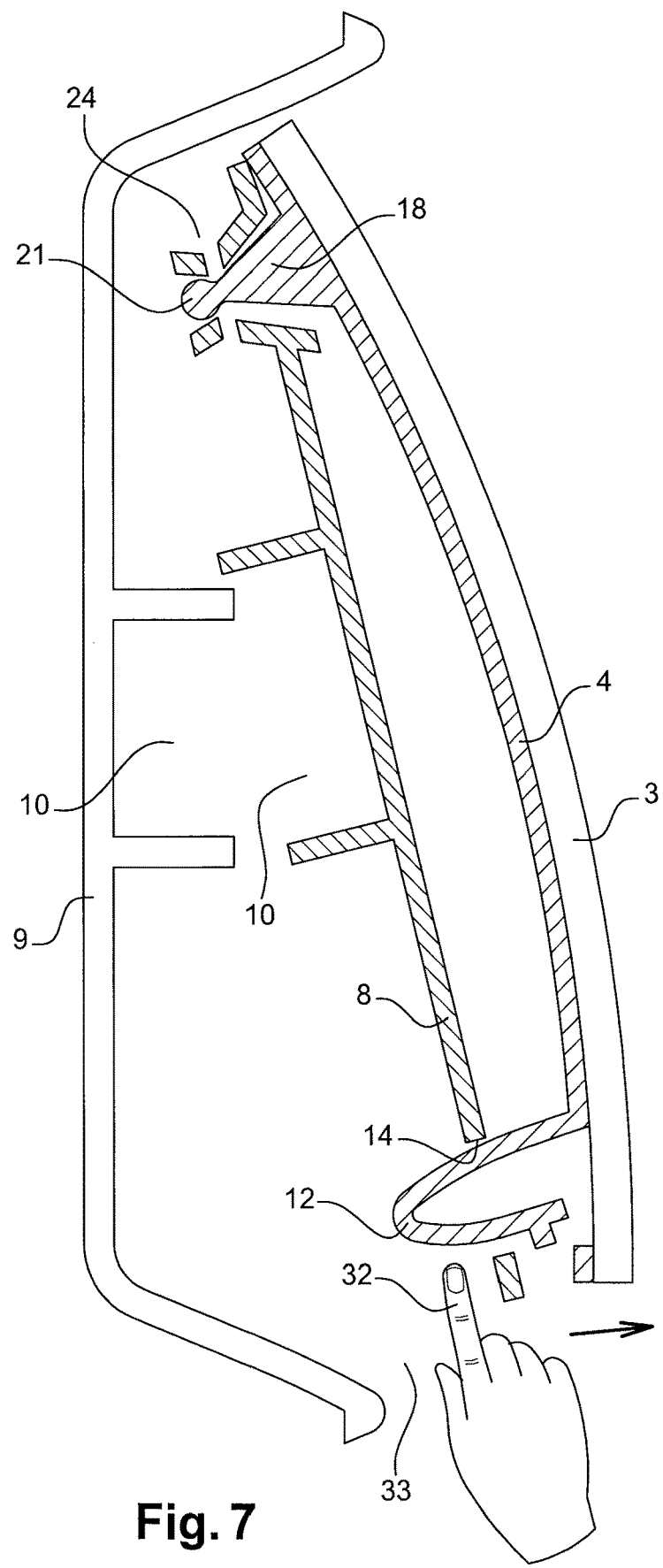
FIG. 7 is a schematic side sectional view of a mirror assembly having its mirror plate removed.

In the occurrence of a collision between the mirror assembly 1 and a surrounding object, the mirror glass 3 can be damaged and thus need replacement. In the case of the mirror assembly 1 of, for example, FIG. 1, a user depresses the flexible tab 28 which in turn pushes the resilient clip 12 thus releasing the mirror plate 2 from the receiving plate 8 as described above. In the case of a mirror assembly 1 without a flexible tab, the actuator 10 put the mirror plate 2 in a position of maximum tilt so as to expose a gap between the casing 6 and the mirror plate 2. As illustrated in FIG. 7, the gap is formed at the lower end of the mirror assembly 1. An operator's finger 32 is shown extending through the gap 33 to depress the resilient clip 12 and release the mounting plate 4 from the receiving plate 8. This type of arrangement which does not include a flexible tab is most likely to be used on large and tall mirrors which tend to create a larger gap.

The mirror plate 2 can then be grabbed and pulled from the receiving plate 8. In the case of a receiving plate 8 equipped with flexible tabs 28, the mirror plate 2 is pushed away from the receiving plate 8. The mirror plate 2 remains retained by the centering pin 18. As, the top angle of each funnel 22 is greater than the top angle of each centering pin 18, the mirror plate 2 has some freedom to tilt and the user can easily grab and disconnect the mirror plate 2 from the receiving plate 8. This pivoting movement will move the mirror plate 2 out of the casing, and enable an operator to easily disengage the socket of the ball and socket joint 24 and thereby fully release the mirror plate 2 from the casing 6.

If no sockets are employed, only clip joints, release of the first clip joint will bias the mirror plate 2 away from the casing, as described above, and the mirror plate 2 may then be simply lifted away from the casing.

Assembly of a new replacing mirror plate is equally straightforward. The mirror plate 2, is offered up to the receiving plate 8. Where ball-in-socket joints 24 are used, the balls 21 are fed into the funnels 22. As may be seen from the figures, both balls 21 and funnels 22 will be visible when this operation is just started. Once the balls 21 have been pressed into their resilient sockets 24 by pressing the mirror plate 2 into the casing 6, then the mirror plate 2 needs to be pivoted in order to slide the resilient clip 12 into full engagement with the receiving plate 8.

The symmetrical lay out of the centering pins 18 and the resilient pins 12 make assembling the mirror plate 2 on the casing 6 via the receiving plate 8 very straightforward.

Thus it will be seen that the assembly according to the invention affords considerably simpler and more straightforward and predictable assembly and disassembly of the mirror plate 2 from the casing 6.

It is to be understood that the present invention is not limited to the embodiments described above and illustrated in the drawings; rather, the skilled person will recognize that many changes and modifications may be made within the scope of the appended claims.

The invention claimed is:

1. A mirror assembly for a vehicle, the assembly including:
   a casing, a base plate fixed in the casing and a receiving plate rotatably attached to the base plate;
   a mirror plate having a mirror glass secured on a mounting plate; and
   an attachment interposed between said receiving plate and said mirror plate, said attachment having a first part provided in the mirror plate and a second part provided in the receiving plate,
   said first part having at least one first centering element and at least one releasable locking element, and
   said second part having at least one second complementary centering element configured to receive the said at least one first centering element and at least one opening configured to receive the said at least one releasable locking element;
   wherein:
   the at least one releasable locking element includes at least one resilient clip engageable into the at least one opening; and
   the at least one resilient clip is positioned on an edge of the receiving plate and in that the casing includes a flexible tap configured to bias the at least one resilient clip into an unlocked position.

2. The mirror assembly of claim 1, wherein the at least one first centering element includes at least one centering pin attached to the mounting plate and the at least one second complementary centering element includes at least one funnel formed in the receiving plate.

3. The mirror assembly of claim 2, wherein the at least one centering pin includes a conical shape defining a first vertex angle and the at least one funnel defines a second vertex angle, the first vertex angle being smaller than the second vertex angle.

4. The mirror assembly of claim 2, wherein the at least one centering pin includes at a distal end a ball and that the at least one funnel comprises a ball-and-socket joint into which the ball comes into engagement.

5. The mirror assembly of claim 4, wherein the at least one releasable locking element includes at least one resilient clip engageable into the at least one opening, and when the at least one resilient clip is released, the mirror plate is rotated about the ball-and-socket joint such that at least a portion of the mirror plate extends outside the casing to allow an operator to grasp the mirror plate and disengage the ball-and-socket joints.

6. The mirror assembly of claim 4, wherein the ball-and-socket joints are positioned in a region of a periphery of the mirror plate to provide stable mounting of the mirror plate in the casing.

7. The mirror assembly of claim 1, wherein the at least one releasable locking element includes a tapered resilient clip engageable into a locking opening in the receiving plate, the locking opening having chamfers.

8. The mirror assembly of claim 1, wherein the receiving plate includes at least one spring tab which exerts an elastic force onto the mounting plate.

9. A vehicle including a mirror assembly, the mirror assembly including:
   a casing, a base plate fixed in the casing and a receiving plate rotatably attached to the base plate;
   a mirror plate having a mirror glass secured on a mounting plate;
   an attachment interposed between said receiving plate and said mirror plate, said attachment having a first part provided in the mirror plate and a second part provided in the receiving plate,
   said first part having at least one first centering element and at least one releasable locking element, and
   said second part having at least one second complementary centering element configured to receive the said at least one first centering element and at least one opening configured to receive the said at least one releasable locking element;
   wherein:
   the at least one releasable locking element includes at least one resilient clip engageable into the at least one opening; and
   the at least one resilient clip is positioned on an edge of the receiving plate and in that the casing includes a flexible tap configured to bias the at least one resilient clip into an unlocked position.

10. A mirror assembly for a vehicle, the assembly including:
   a casing, a base plate fixed in the casing and a receiving plate rotatably attached to the base plate;
   a mirror plate having a mirror glass secured on a mounting plate; and
   an attachment interposed between said receiving plate and said mirror plate, said attachment having a first part provided in the mirror plate and a second part provided in the receiving plate, said first part having at least one first centering element and at least one releasable locking element, and said second part having at least one second complementary centering element configured to receive the said at least one first centering element and at least one opening configured to receive the said at least one releasable locking element;

wherein:

the at least one first centering element includes at least one centering pin attached to the mounting plate and the at least one second complementary centering element includes at least one funnel formed in the receiving plate; and the at least one centering pin includes at a distal end a ball and that the at least one funnel comprises a ball-and-socket joint into which the ball comes into engagement.

11. The mirror assembly of claim 10, wherein the at least one centering pin includes a conical shape defining a first vertex angle and the at least one funnel defines a second vertex angle, the first vertex angle being smaller than the second vertex angle.

12. The mirror assembly of claim 10, wherein the at least one releasable locking element includes at least one resilient clip engageable into the at least one opening, and when the at least one resilient clip is released, the mirror plate is rotated about the ball-and-socket joint such that at least a portion of the mirror plate extends outside the casing to allow an operator to grasp the mirror plate and disengage the ball-and socket joints.

13. The mirror assembly of claim 10, wherein the ball-and-socket joints are positioned in a region of a periphery of the mirror plate to provide stable mounting of the mirror plate in the casing.

14. A vehicle including a mirror assembly, the mirror assembly including:

a casing, a base plate fixed in the casing and a receiving plate rotatably attached to the base plate;

a mirror plate having a mirror glass secured on a mounting plate;

an attachment interposed between said receiving plate and said mirror plate, said attachment having a first part provided in the mirror plate and a second part provided in the receiving plate, said first part having at least one first centering element and at least one releasable locking element, and said second part having at least one second complementary centering element configured to receive the said at least one first centering element and at least one opening configured to receive the said at least one releasable locking element;

wherein:

the at least one first centering element includes at least one centering pin attached to the mounting plate and the at least one second complementary centering element includes at least one funnel formed in the receiving plate; and the at least one centering pin includes at a distal end a ball and that the at least one funnel comprises a ball-and-socket joint into which the ball comes into engagement.

15. The mirror assembly of claim 14, wherein the at least one centering pin includes a conical shape defining a first vertex angle and the at least one funnel defines a second vertex angle, the first vertex angle being smaller than the second vertex angle.

16. The mirror assembly of claim 14, wherein the at least one releasable locking element includes at least one resilient clip engageable into the at least one opening, and when the at least one resilient clip is released, the mirror plate is rotated about the ball-and-socket joint such that at least a portion of the mirror plate extends outside the casing to allow an operator to grasp the mirror plate and disengage the ball-and socket joints.

17. The mirror assembly of claim 14, wherein the ball-and-socket joints are positioned in a region of a periphery of the mirror plate to provide stable mounting of the mirror plate in the casing.

* * * * *